US007742866B2

(12) United States Patent
McLain et al.

(10) Patent No.: US 7,742,866 B2
(45) Date of Patent: Jun. 22, 2010

(54) FUEL VOLATILITY COMPENSATION FOR ENGINE COLD START SPEED CONTROL

(75) Inventors: Kurt D. McLain, Clarkston, MI (US); Wenbo Wang, Novi, MI (US)

(73) Assignee: GM Global Technology Operations, Inc.

(*) Notice: Subject to any disclaimer, the term of this patent is extended or adjusted under 35 U.S.C. 154(b) by 321 days.

(21) Appl. No.: 11/954,872

(22) Filed: Dec. 12, 2007

(65) Prior Publication Data

US 2009/0088947 A1 Apr. 2, 2009

Related U.S. Application Data

(60) Provisional application No. 60/976,610, filed on Oct. 1, 2007.

(51) Int. Cl.
*F02D 41/30* (2006.01)
*G06F 19/00* (2006.01)

(52) U.S. Cl. .................................... 701/103; 73/117.03

(58) Field of Classification Search ................. 701/103, 701/102, 104, 115; 73/118.1, 116, 117.3; 123/478, 435, 486, 520
See application file for complete search history.

(56) References Cited

U.S. PATENT DOCUMENTS 6,079,396 A * 6/2000 Ament et al. ............... 701/113
6,178,949 B1 * 1/2001 Kirwan et al. ............... 123/435
6,588,409 B2 * 7/2003 Maloney et al. ............. 123/686
6,848,421 B1 * 2/2005 Karau et al. ........... 123/406.22
6,880,392 B2 * 4/2005 Lee et al. ................. 73/114.38

* cited by examiner

*Primary Examiner*—Hieu T Vo

(57) ABSTRACT

A fuel control system includes devices that generate parameter signals. The parameter signals include an engine runtime signal and at least one of an engine load signal, a temperature signal and a barometric pressure signal. A modification module generates a modification signal based on the parameter signals. A control module compensates for a current fuel volatility by adjusting a current air/fuel mixture of an engine based on the modification signal.

20 Claims, 4 Drawing Sheets

FUEL VOLATILITY COMPENSATION FOR ENGINE COLD START SPEED CONTROL

CROSS-REFERENCE TO RELATED APPLICATIONS

This application claims the benefit of U.S. Provisional Patent Application No. 60/976,610, filed on Oct. 1, 2007. The disclosure of the above application is incorporated herein by reference in its entirety.

FIELD OF THE INVENTION

The present invention relates to internal combustion engines, and more particularly to air/fuel ratio control systems for internal combustion engines.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In an internal combustion engine (ICE) fuel may be injected into an intake manifold, for example single port injection per fuel bank, per engine or multi-ports injection per cylinder. Alternatively or additionally, fuel may be injected directly into cylinders. The fuel is then mixed with air to form an air/fuel mixture. The air/fuel mixture is combusted to generate torque. The fuel and air may be controlled such that the engine maintains an air-to-fuel ratio at stoichiometry. The engine may operate using fuels with different stoichiometric values, such as a gasoline and ethanol blend. As the percentage of each fuel in the overall fuel mixture changes, the stoichiometric value may change.

The stoichiometric value of a fuel mixture may be measured to allow for optimal operation of the engine based on the particular fuel mixture. The engine system may change the relative amounts of air and fuel delivered to the cylinders based on the stoichiometric value for the fuel mixture.

The volatility or the measure of how quickly fuel vaporizes changes with the type of fuel and the operating engine temperature. For example, during cold starts when an engine is at an ambient temperature or is not up to a normal operating temperature, fuel vaporizes at a reduced rate. This affects the ability of an engine to maintain a predetermined idle speed.

SUMMARY

In one exemplary embodiment, a fuel control system is provided that includes devices that generate parameter signals. The parameter signals include an engine runtime signal and one or more of an engine load signal, a temperature signal and a barometric pressure signal. A modification module generates a modification signal based on the parameter signals. A control module compensates for a current fuel volatility by adjusting a current air/fuel mixture of an engine based on the modification signal.

The fuel injection system may include a fuel injector that injects fuel into one of an intake manifold and a combustion chamber of a cylinder of an engine. The control module initiates multiple fuel injections in the intake manifold or combustion chamber during a combustion cycle of the cylinder via the fuel injector.

In other features, a fuel control system is provided that includes an engine runtime indicator, which generates an engine run time signal. An engine load module generates the engine load signal. A temperature sensor generates a temperature signal. A barometric pressure sensor generates a barometric pressure signal. A control module compensates for a current fuel volatility by adjusting a current air/fuel mixture of an engine based on the engine run time signal, the engine load signal, the temperature signal, and the barometric pressure signal.

In yet other features, a fuel control method includes generating parameter signals. The parameter signals include an engine runtime signal and one or more of an engine load signal, a temperature signal and a barometric pressure signal. Modification signals are generated based on the parameter signals. A combined signal is generated based on the modification signals. A current idle speed is adjusted via adjustment in a current air/fuel mixture of an engine based on the combined signals.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description and the accompanying drawings, wherein.

DETAILED DESCRIPTION

Figure 1:
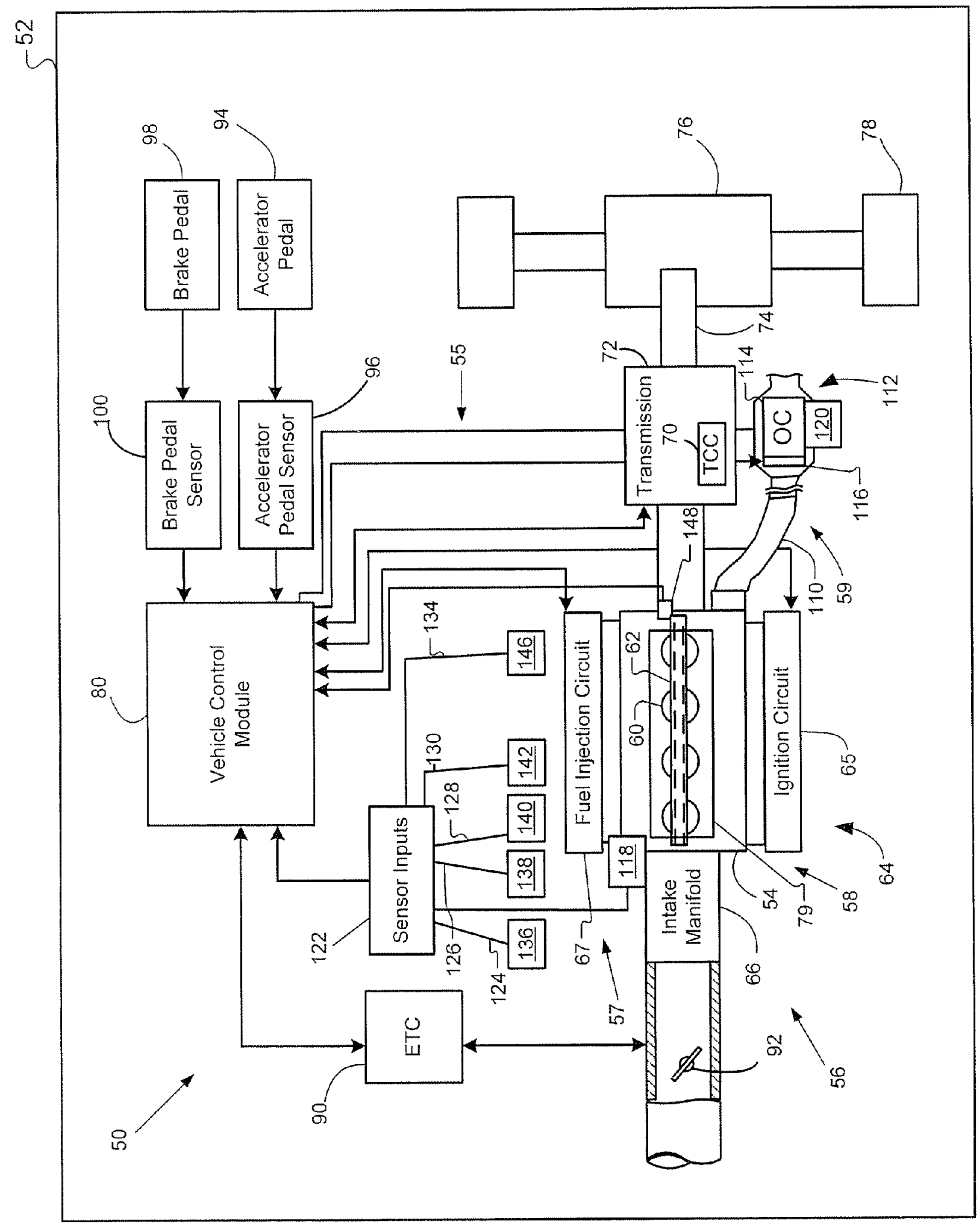
FIG. 1 is a functional block diagram of an internal combustion engine system incorporating fuel volatility compensation in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Also, as used herein, the term combustion cycle refers to the reoccurring stages of an engine combustion process. For example, in a 4-stroke internal combustion engine, a single combustion cycle may refer to and include an intake stroke, a compression stroke, a power stroke and an exhaust stroke. The four-strokes are continuously repeated during operation of the engine.

In addition, although the following embodiments are described primarily with respect to example internal combustion engines, the embodiments of the present disclosure may apply to other internal combustion engines. For example, the embodiments of the present disclosure may apply to compression ignition, spark ignition, homogenous spark ignition, homogeneous charge compression ignition, stratified spark ignition, and spark assisted compression ignition engines. The embodiments also apply to diesel engines and applications. The embodiments further apply to gasoline or high volatility fuel engines.

Referring now to FIG. 1, a functional block diagram of an internal combustion engine system 50 incorporating fuel volatility compensation is shown. The engine system 50 is on a vehicle 52 and includes an engine 54, and a fuel volatility compensation system 55 that includes an air intake control system 56, a fuel injection system 57, and may include a valve lift control system 58 and an exhaust system 59. The fuel volatility compensation system adjusts volatility of fuel entering cylinders of the engine. The volatility may be indirectly adjusted by adjusting an air/fuel ratio for each of the cylinders.

Figure 2:
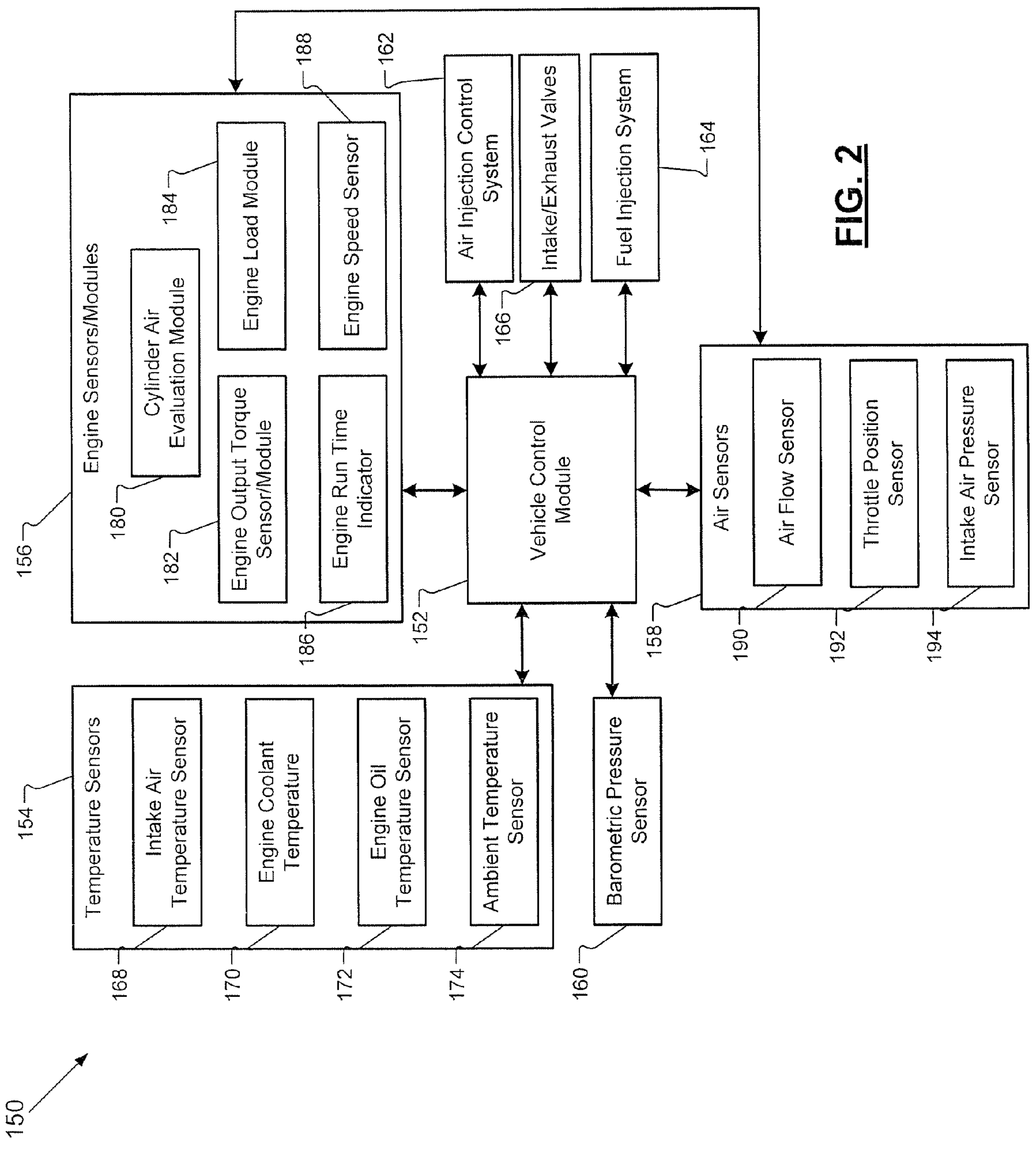
FIG. 2 is a functional block diagram of a fuel volatility compensation system in accordance with an embodiment of the present disclosure.

The engine 54 has cylinders 60. Each cylinder 60 may have one or more intake valves and/or exhaust valves. Each cylinder 60 also includes a piston that rides on a crankshaft 62. The engine 54 is configured with at least a portion of the valve lift control system 58 and may be configured with an ignition system 64 with an ignition circuit 65. The engine 54 includes an intake manifold 66. The engine 54 combusts an air and fuel mixture to produce drive torque. The engine 54, as shown, includes four cylinders in an in-line configuration. Although FIG. 2 depicts four cylinders (N=4), it can be appreciated that the engine 54 may include additional or fewer cylinders. For example, engines having 2, 4, 5, 6, 8, 10, 12 and 16 cylinders are contemplated. It is also anticipated that the fuel injection control of the present invention can be implemented in a V-type or another type of cylinder configuration.

An output of the engine 54 is coupled by a torque converter 70, a transmission 72, a driveshaft 74 and a differential 76 to driven wheels 78. The transmission 72 may, for example, be a continuously variable transmission (CVT) or a step-gear automatic transmission. The transmission 72 is controlled by a vehicle control module 80.

The valve lift control system 58 controls variable opening lift operation of intake and exhaust valves of the engine 54. The intake and exhaust valves of the engine 54 may each operate in 2-step, multi-step, or variable lift modes. The variable valve lift control system 58 operates based on various characteristics and parameters of the engine 54. The valve lift control system 58 includes an intake and exhaust valve assembly (head) 79, the control module 80, and various sensors. Some of the sensors are shown in FIGS. 1 and 2. The control module 80 controls lift operation of intake and exhaust valves of the valve assembly 79.

Air is drawn into the intake manifold 66 via an electronic throttle controller (ETC) 90, or a cable-driven throttle, which adjusts a throttle plate 92 that is located adjacent to an inlet of an intake manifold 66. The adjustment may be based upon a position of an accelerator pedal 94 and a throttle control algorithm that is executed by the control module 80. The throttle 92 adjusts output torque that drives the wheels 78. An accelerator pedal sensor 96 generates a pedal position signal that is output to the control module 80 based on a position of the accelerator pedal 94. A position of a brake pedal 98 is sensed by a brake pedal sensor or switch 100, which generates a brake pedal position signal that is output to the control module 80.

Air is drawn into the cylinders 60 from the intake manifold 66 and is compressed therein. Fuel is injected into cylinders 60 by the fuel injection circuit 67 and the spark generated by the ignition system 64 ignites the air/fuel mixtures in the cylinders 60. Exhaust gases are exhausted from the cylinders 60 into the exhaust system 59. In some instances, the engine system 80 can include a turbocharger that uses an exhaust driven turbine to drive a compressor that compresses the air entering the intake manifold 66. The compressed air may pass through an air cooler before entering into the intake manifold 66.

The fuel injection system 57 includes a fuel injection circuit 67 with fuel injectors that may be associated with each of the cylinders 60 and/or associated with the intake manifold 66. A fuel rail provides fuel to each of the fuel injectors after reception from, for example, a fuel pump or reservoir. The control module 80 controls operation of the fuel injectors including the number and timing of fuel injections into each of the cylinders 60 and/or the intake manifold 66 and per combustion cycle thereof. The fuel injection timing may be relative to crankshaft positioning.

The ignition system 64 may include spark plugs or other ignition devices for ignition of the air/fuel mixtures in each of the cylinders 60. The ignition system 64 also may include the control module 80. The control module 80 may, for example, control spark timing relative to crankshaft positioning.

The exhaust system 59 may include exhaust manifolds and/or exhaust conduits, such as the conduit 110 and a filter system 112. The exhaust manifolds and conduits direct the exhaust exiting the cylinders 60 into filter system 112. Optionally, an EGR valve re-circulates a portion of the exhaust back into the intake manifold 66. A portion of the exhaust may be directed into a turbocharger to drive a turbine. The turbine facilitates the compression of the fresh air received from the intake manifold 66. A combined exhaust stream flows from the turbocharger through the filter system 112.

The filter system 112, shown for a diesel embodiment, may include a catalytic converter or an oxidation catalyst (OC) 114 and a heating element 116, as well as a particulate filter, a liquid reductant system and/or other exhaust filtration system devices. The heating element 116 may be used to heat the oxidation catalyst 114 during startup of the engine 54 and be controlled by the control module 80. The liquid reductant may include urea, ammonia, or some other liquid reductant. Liquid reductant is injected into the exhaust stream to react with NOx to generate water vapor ($H_2O$) and $N_2$ (nitrogen gas). The exhaust system, such as in a gasoline engine application, may include tree way catalysts (TWC) to oxidize hydrocarbon (HC), carbon monoxide (CO) and to reduce NOx.

The valve lift control system 58 further includes an engine temperature sensor 118 and an exhaust temperature sensor 120. The engine temperature sensor 118 may detect oil or coolant temperature of the engine 54 or some other engine temperature. The exhaust temperature sensor 120 may detect temperature of the oxidation catalyst 114 or some other component of the exhaust system 59. The temperatures of the engine 54 and the exhaust system 59 may be indirectly determined or estimated based on engine and exhaust operating parameters and/or other temperature signals. Alternatively, the temperatures of the engine 54 and the exhaust system 59 may be determined directly via the engine and exhaust temperature sensors 118, 120.

Other sensor inputs collectively indicated by reference number 122 and used by the control module 80 include an engine speed signal 124, a vehicle speed signal 126, a power supply signal 128, oil pressure signal 130, and a cylinder identification signal 134. The sensor input signals 124-134 are respectively generated by engine speed sensor 136, vehicle speed sensor 138, a power supply sensor 140, an oil pressure sensor 142, and cylinder identification sensor 146. Some other sensor inputs may include an intake manifold pressure signal, a throttle position signal, a transmission signal, and manifold air temperature signal.

The valve lift control system 58 may also include one or more timing sensors 148. Although the timing sensor 148 is shown as a crankshaft position sensor, the timing sensor may be a camshaft position sensor, a transmission sensor, or some other timing sensor. The timing sensor generates a timing signal that is indicative of position of one or more pistons and/or a crankshaft.

The valve lift control system 58 includes an intake/exhaust valve assembly that receives oil from an oil reservoir via an oil pump. The oil is filtered prior to reception by the valve assembly. The vehicle control module 80 controls lift operation of intake and exhaust valves of the valve assembly.

The valve assembly includes the intake and exhaust valves, which have open and closed states and are actuated via one or more camshafts. A dedicated intake camshaft and a dedicated exhaust camshaft may be included. In another embodiment, the intake and exhaust valves share a common camshaft. When in an open state the intake and exhaust valves may be operating in various lift modes, some of which are mentioned above. The valve assembly also includes valve lift mode adjustment devices. The lift mode adjustment devices may include oil pressure control valves, such as valve lift control solenoids, lift pins, levers, rockers, springs, locking mechanisms, tappets, etc.

The valve lift control system 58 may include an oil temperature sensor and/or an oil pressure sensor. The control module signals the oil pressure control valves based on temperature and pressure signals received from the temperature and pressure sensors.

Referring now to FIG. 2, a functional block diagram of a fuel volatility compensation system 150 is shown. The fuel volatility compensation system 150 includes a vehicle control module 152. The fuel volatility compensation system 150 also includes temperature sensors 154, engine sensors and modules 156, air-related sensors 158, and a pressure sensor 160. The vehicle control module 152 controls an air intake/injection control system 162, a fuel injection system 164, and may control lift and timing of intake and exhaust valves 166.

The temperature sensors 154 include an intake temperature sensor 168, an engine coolant temperature sensor 170, an engine oil temperature sensor 172, an ambient temperature sensor 174, and may include other engine temperature sensors. The intake air temperature sensor 168 may generate an intake air temperature (IAT) signal. The engine coolant temperature sensor 170 may generate an engine coolant temperature (ECT) signal. The engine oil temperature sensor 172 may generate an engine oil temperature ($T_{OIL}$) signal. The ambient temperature sensor 174 may generate an ambient temperature (AMB) signal.

The engine sensors and modules 156 include a cylinder air evaluation module 180, an engine output torque sensor or module 182, an engine load module 184, an engine runtime indicator 186, an engine speed sensor 188. The cylinder air evaluation module 180 determines status of air within cylinders of an engine. The status may include, for example, flow rate and cylinder air mass. The cylinder air evaluation module 180 determines the status based on air-related signals generated by the air sensors 158 and engine output torque. The engine output torque may be directly or indirectly measured or estimated. The engine output torque may be directly measure via one or more sensors, such as a drive shaft torque sensor, a strain gauge, or other torque sensor. The engine output torque may be indirectly estimated based on engine operating parameters some of which are disclosed herein, for example, using a look-up table. The engine speed sensor 188, such as a camshaft, crankshaft, flywheel or transmission sensor, generates speed signal that is indicative of engine speed RPM. The vehicle control module 152 can determine engine speed from the speed signal. Note that the engine speed may also be indirectly estimated based on engine operating parameters.

The air sensors 158 include an air flow sensor 190, a throttle position sensor 192, an intake air pressure sensor 194, and may include other air-related sensors. An air flow sensor 190 may be a mass air flow (MAF) sensor that monitors the air flow rate through a throttle. The throttle position sensor 192 is responsive to a position of a throttle plate and generates a throttle position signal TPS. The intake air pressure sensor 194 generates a manifold absolute pressure (MAP) signal.

The pressure sensor 160 may be responsive to atmospheric pressure and may generate a barometric pressure BARO signal.

Figure 3:
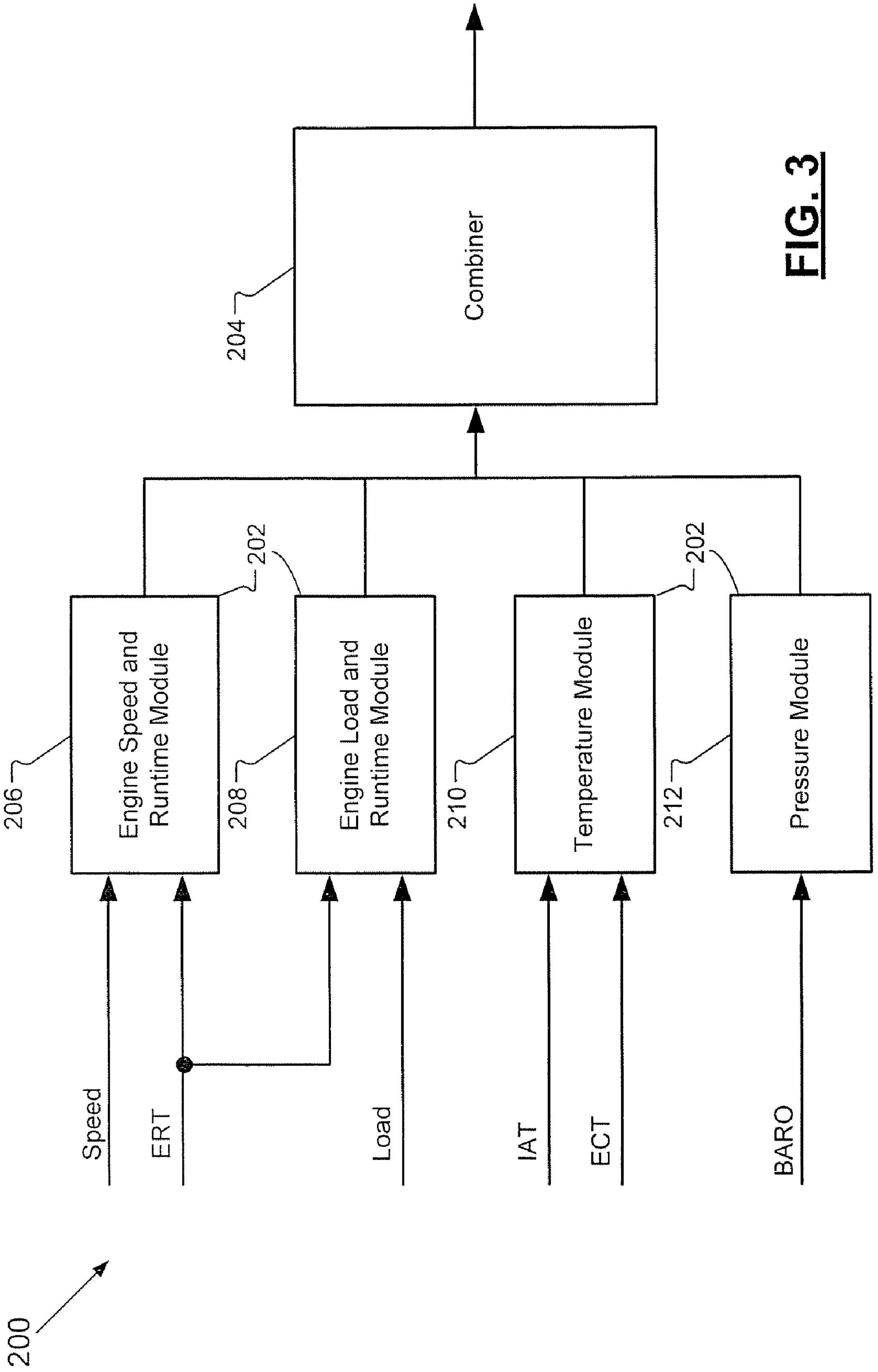
FIG. 3 is a perspective view of another fuel volatility compensation system in accordance with an embodiment of the present disclosure.

Referring now to FIG. 3, a perspective view of another fuel volatility compensation system 200 is shown. The fuel volatility compensation system 200 may include or be part of a vehicle control module, such as one of the vehicle control modules 80 and 152. The fuel volatility compensation system 200 includes modification modules 202 and a combiner 204, which may be part of a single control module or may include separate stand-alone modules as shown.

The modification modules 202 may include look-up tables and/or fuzzy logic rules. Each table may include data that is predetermined, measured, and stored in the modification modules 202 or corresponding memory. The fuzzy logic rules allow for non-linear compensation and control with the use of a reduced amount of memory. When tables are used, the modification modules 202 look-up the associated inputs and provide modification signals that are combined by the combiner 204. When fuzzy logic is used, the modification modules 202 apply the associated inputs to a predetermined set of rules and generate modification signals that are outputted to the combiner 204. A combination of tabular look-up and fuzzy logic may be used. The fuzzy logic may include if-then statements that result in a combined output result, which is interpreted by the vehicle control module 152 to adjust an air/fuel ratio to be leaner or richer. This adjustment may be used to adjust an idle speed of the engine during a cold start.

A cold start refers to the cranking and initial ignition and running of an engine when the coolant temperature of the engine minus ambient temperature is less than a threshold, such as for example 12° C. This cold start may occur when the engine coolant temperature is higher than ambient temperature.

The modification modules 202 include an engine speed and runtime module 206, a load and engine runtime module 208, a temperature module 210 and a pressure module 212. The engine speed and runtime module 206 receives the engine speed signal RPM and a load signal LOAD. The load signal may be generated based on the air flow signal, the throttle position signal, the engine output torque signal, a cylinder air status signal, and/or other load related signal. The load and engine runtime module 208 receives the load signal and the engine runtime signal. The temperature module 210 receives the intake air temperature signal, the engine coolant temperature signal and/or other engine temperature signals. The pressure module 212 receives the pressure signal BARO.

The engine speed and runtime module 206 generates a speed modification signal. The load and engine runtime module 208 generates a load modification signal. The temperature module 210 generates a temperature modification signal. The pressure module 212 generates a pressure modification signal. The stated modification signals may be referred to as error signals.

The modification signals may be provided to the combiner 204 to generate an air/fuel ratio adjustment signal, an idle speed adjustment signal, and/or a fuel volatility adjustment signal. As an example, the combiner 204 may include a summer or multiplier for summing and/or multiplying the modification signals.

Figure 4:
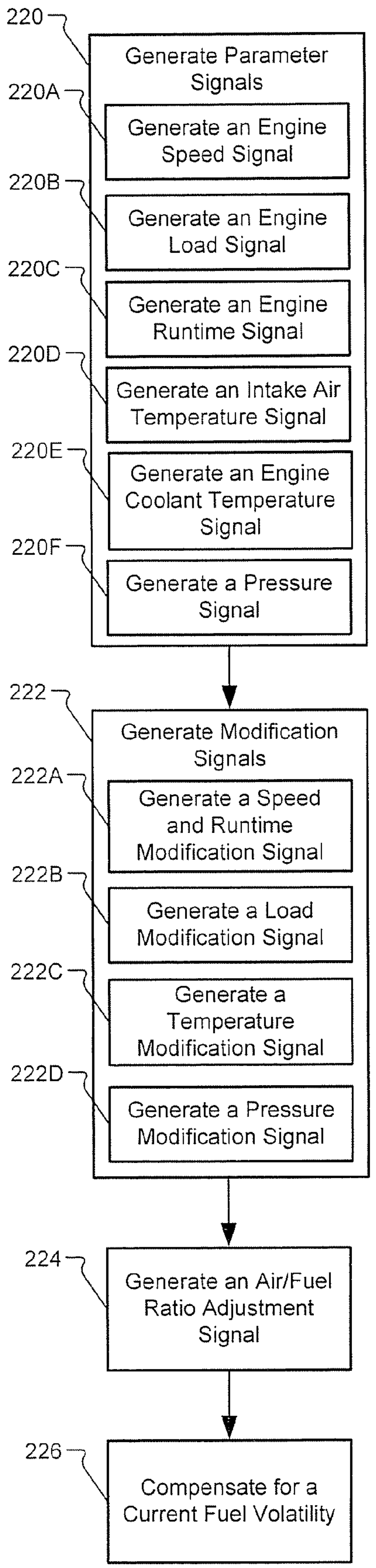
FIG. 4 is a logic flow diagram illustrating a method of operating an internal combustion engine incorporating fuel volatility compensation in accordance with an embodiment of the present disclosure.

Referring now to FIG. 4, a logic flow diagram illustrating a method of operating an internal combustion engine incorporating fuel volatility compensation is shown. Although the following steps are primarily described with respect to the embodiments of FIGS. 2-3, the steps may be applied to other embodiments of the present disclosure.

In step 220, devices generate parameter signals, which are indicative of a current state of fuel volatility. The devices may include any of the above described sensors, modules and indicators. The parameter signals may include any of the signals generated by the above sensors, modules, and indicators. An example embodiment is described below with respect to steps 220A-F.

In step 220A, an engine speed sensor or module generates an engine speed signal. In step 220B, an engine load module generates an engine load signal. In step 220C, an engine runtime indicator generates an engine runtime signal. An engine runtime signal may be approximately equal to a length of time between a current engine operating time and an engine startup time. The engine startup time may be associated with an initial ignition of the engine, an initial cranking of the engine, a turn key event and/or a predetermined time.

In step 220D, an intake air temperature signal is generated. In step 220E, an engine coolant temperature signal is generated. In step 220F, a pressure signal is generated, such as the barometric pressure signal BARO. The barometric pressure may be sensed or estimated based on manifold absolute pressure, which may be sensed during engine startup. Steps 220A-F may be performed during the same time period, simultaneously, sequentially, or in a predetermined order.

In step 222, the modification modules generate modification signals based on the parameter signals. The modification signals may include error information. Steps 222A-222D are shown as part of one example embodiment. Step 222A, includes the generation of a speed and runtime modification signal based on the engine speed signal and engine load signal. The engine speed or idle speed may be compared with a predetermined idle speed for a given engine runtime. Cold start engine speed varies depending on fuel volatility and engine runtime. A fuzzy logic table may be used to compensate for the variations in fuel volatility by contributing to the speed and runtime modification signal. This fuzzy logic table may be based on known speed and runtime values of various fuel volatilities. As an example, when engine speed is too high or too low, control reduces or adds fuel in step 226 to compensate for the current state of fuel volatility.

Step 222B, includes the generation of a load modification signal based on the engine load signal and the engine runtime signal. The load modification signal may be based on cylinder air or the air consumed by each cylinder per cycle. A current engine load may be compared with a predetermined engine load for a given engine runtime. The fuzzy logic table associated with step 222B may be based on known load and runtime values of various fuel volatilities.

Step 222C, includes the generation of a temperature modification signal based on the intake air temperature signal and the engine coolant temperature signal. The fuzzy logic table associated with step 222C may be based on known temperature values of various fuel volatilities.

Step 222D, includes the generation of a pressure modification signal based on the barometric pressure signal. The fuzzy logic table associated with step 222D may be based on known pressure values of various fuel volatilities. The associated pressure table for the pressure module may provide a correction factor based on pressure values that affect cold start combustion characteristics. As an example, when the pressure is low, the fuel volatility may be high, thus the correction factor may be generated accordingly.

The modification signals may be generated via the speed and runtime module, the load module, the temperature module, and the pressure module. The modules may store and/or look-up values in associated tables, models, and/or use fuzzy logic to generate the modification signals. When tables are used, the values stored in the tables may include predetermined values determined during engine testing. Fuzzy logic rules and membership functions may be used to approximate continuous functions. The number of rules may vary per application. The fuzzy logic includes arithmetic interpolation for non-linear functions. If-then statements may be used in implementation of the fuzzy logic rules.

In step 224, a combiner generates an air/fuel ratio adjustment signal based on the modification signals. The modification signals are combined to generate the air/fuel ratio adjustment signal, which is used to maintain the engine running around stoicmetric with minimum emissions output. The combiner may include a summer, a multiplier, and/or other logic devices. The air/fuel ratio adjustment signal may be referred to as a fuel volatility adjustment signal. By adjusting the air/fuel ratio changes in fuel volatility is compensated.

In step 226, a control module compensates for a current fuel volatility by adjusting a current air/fuel mixture of an engine based on the air/fuel ratio adjustment signal to provide an idle speed. The control module provides a richer or leaner fuel based on the air/fuel ration adjustment signal. As the fuel volatility changes due to, for example, change in fuel, air/fuel ratios, temperatures, operating conditions, pressures, etc., the control module adjusts for these changes to provide a smooth and accurate idle speed. The idle speed may be provided during a cold start or during other operating temperatures. The idle speed may be adjusted based on engine coolant temperature and engine run time or other engine and exhaust system parameters. Measured or actual engine speed is controlled to smoothly and accurately follow a selected or predetermined speed.

The above-described steps are meant to be illustrative examples; the steps may be performed sequentially, synchronously, simultaneously, continuously, during overlapping time periods or in a different order depending upon the application.

The embodiments disclosed herein dynamically control cold start engine idle speed when fuel of various volatility values is used. Fuzzy logic may be used by control algorithms to control engine idle speed and emissions output by analyzing various engine conditions and ambient temperature conditions. The effects of altitude, load and wide temperature variations are monitored. The embodiments provide cold start idle quality and emissions control. Precise control of engine operating speed is based on fuel volatility and engine and ambient temperature conditions.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A fuel control system comprising:

a plurality of devices generating a plurality of parameter signals comprising an engine runtime signal and at least one of an engine load signal, a temperature signal and a barometric pressure signal;

a modification module generating a modification signal based on said plurality of parameter signals; and a control module compensating for a current fuel volatility by adjusting a current air/fuel mixture of an engine based on said modification signal.

2. The fuel control system of claim 1 comprising:

an engine runtime indicator generating said engine run time signal; and an engine load module generating said engine load signal.

3. The fuel control system of claim 2 further comprising an air flow sensor that generates an air flow signal, wherein said engine load module generates said engine load signal based on said air flow signal.

4. The fuel control system of claim 2 further comprising a throttle position sensor that generates a throttle position signal, wherein said engine load module generates said engine load signal based on said throttle position signal.

5. The fuel control system of claim 2 further comprising a cylinder air evaluation module generating a cylinder air signal, wherein said engine load module generates said engine load signal based on said cylinder air signal.

6. The fuel control system of claim 5 wherein said cylinder air signal includes at least one of cylinder air flow and cylinder air mass.

7. The fuel control system of claim 1 wherein said control module generates said modification signal via tabular look-up of said plurality of parameter signals, and wherein said air/fuel ratio is adjusted based on said modification signal.

8. The fuel control system of claim 1 wherein said control module generates said modification signal via fuzzy logic processing of said plurality of parameter signals, and wherein said air/fuel ratio is adjusted based on said modification signal.

9. The fuel control system of claim 1 further comprising an engine speed sensor generating an engine speed signal, wherein said control module adjusts said current air/fuel mixture based on said engine speed signal.

10. The fuel control system of claim 1 wherein said engine runtime signal is based on a startup time that is associated with at least one of an initial ignition of the engine, an initial cranking of the engine, a turn key event and a predetermined time.

11. The fuel control system of claim 1 comprising:

a first modification module generating a first modification signal based on said engine runtime signal and said engine load signal;

a second modification module generating a second modification signal based on an engine speed signal and said engine runtime signal; and a combiner generating a combined signal based on said first and second modification signals, wherein said control module compensates for a current fuel volatility by adjusting a current air/fuel mixture of an engine based on said combined signal.

12. The fuel control system of claim 1 wherein said control module enables said adjusting of said current air/fuel ratio when said temperature signal is less than a predetermined temperature.

13. A fuel control system comprising:

an engine runtime indicator generating an engine run time signal;

an engine load module generating said engine load signal a temperature sensor generating a temperature signal;

a barometric pressure sensor generating a barometric pressure signal; and a control module compensating for a current fuel volatility by adjusting a current air/fuel mixture of an engine based on said engine run time signal, said engine load signal, said temperature signal, and said barometric pressure signal.

14. The fuel control system of claim 13 wherein said temperature sensor generates at least one of an intake air temperature signal and an engine coolant temperature signal, and wherein said control module adjusts said current air/fuel mixture based on said at least one of said intake air temperature signal and said engine coolant temperature signal.

15. The fuel control system of claim 13 wherein said control module generates a modification signal via fuzzy logic processing of said engine runtime signal, said engine load signal, said temperature signal, and said barometric pressure signal, and wherein said air/fuel ratio is adjusted based on said modification signal.

16. A fuel control method comprising:

generating a plurality of parameter signals comprising an engine runtime signal and at least one of an engine load signal, a temperature signal and a barometric pressure signal;

generating a plurality of modification signals based on said plurality of parameter signals;

generating a combined signal based on said plurality of modification signals; and adjusting a current idle speed by adjusting a current air/fuel mixture of an engine based on said combined signals.

17. The fuel control method of claim 16 comprising:

generating an engine speed signal, wherein said control module adjusts said current air/fuel mixture based on said engine speed signal.

18. The method of claim 16 comprising:

generating said plurality of modification signals via tabular look-up of said plurality of parameter signals, wherein said air/fuel ratio is adjusted based on said plurality of modification signals.

19. The method of claim 16 comprising:

generating said plurality of modification signals via fuzzy logic processing of said plurality of parameter signals; and adjusting said air/fuel ratio based on said plurality of modification signals.

20. The method of claim 16 comprising:

generating at least one of an intake air temperature signal and an engine coolant temperature signal, wherein said control module adjusts said current air/fuel mixture based on said at least one of said intake air temperature signal and said engine coolant temperature signal.

* * * * *